United States Patent [19]

Egami et al.

[11] 4,391,132

[45] Jul. 5, 1983

[54] GAS FLOW MEASURING APPARATUS

[75] Inventors: Tsuneyuki Egami, Aichi; Hisasi Kawai, Toyohashi; Tokio Kohama, Nishio; Hideki Obayashi, Okazaki, all of Japan

[73] Assignee: Nippon Soken, Inc., Nishio, Japan

[21] Appl. No.: 301,448

[22] Filed: Sep. 11, 1981

[30] Foreign Application Priority Data

Sep. 17, 1980 [JP] Japan .............................. 55-130003

[51] Int. Cl.³ .................... G01F 1/68; G01M 15/00
[52] U.S. Cl. ........................................ 73/118; 73/204
[58] Field of Search ...................... 73/204, 116, 118 A

[56] References Cited

U.S. PATENT DOCUMENTS

| | | | |
|---|---|---|---|
| 4,067,233 | 1/1978 | Obayashi et al. | 73/116 |
| 4,089,214 | 5/1978 | Egami et al. | 73/16 |
| 4,275,590 | 6/1981 | Kawai et al. | 73/204 |
| 4,304,129 | 12/1981 | Kawai et al. | 73/118 A |

Primary Examiner—E. R. Kazenske
Assistant Examiner—David R. Schuster
Attorney, Agent, or Firm—Cushman, Darby & Cushman

[57] ABSTRACT

A gas flow measuring apparatus includes first and second temperature dependent resistors located in a gas tube respectively downstream and upstream of an electric heater which is also located in the gas tube. The first and second temperature dependent resistors are connected to form a bridge circuit together with first and second reference resistors. Between a pair of diagonal junctions of the bridge circuit, a potential difference is produced depending on the flow rate of the gas and the power supplied to the electric heater, and a measuring circuit controls the power supplied to the electric heater so that the potential difference is maintained at a predetermined value irrespective of a change in flow rate of the gas. The measuring circuit includes a chopper circuit to convert the potential difference into a square wave having a peak-to-peak value substantially equal to the potential difference and having a center reference level of the square wave corresponding to a voltage level determined by a reference voltage generator and an adder circuit. The square wave from the chopper circuit is then amplified and half rectified and applied to a sample-hold circuit to produce a voltage signal representative of the potential difference. A differential amplifier having two inputs of the voltage signal from the sample-hold circuit and a predetermined voltage produces an output signal which is used to control the power supplied to the electric heater. A current flowing into the electric heater is used to determine the flow rate of the gas.

5 Claims, 5 Drawing Figures

GAS FLOW MEASURING APPARATUS

BACKGROUND OF THE INVENTION

The present invention relates to a gas flow measuring apparatus, or more in particular to an apparatus for measuring the flow rate of the engine intake air.

Conventional apparatus have been known, which include a flow rate measuring tube in the intake pipe, an electric heater in the flow rate measuring tube, and a pair of temperature-dependent resistors disposed before and after the electric heater, thereby to measure the flow rate of the intake air in response to the outputs of the resistors.

These conventional apparatus have the advantage that the measuring accuracy is not changed by the mounting position due to a compact and simple construction thereof. Nevertheless, a DC voltage is applied to a bridge including the two temperature-dependent resistors and two reference resistors, and a voltage between a pair of diagonal points of the bridge is amplified by a DC differential amplifier, and a voltage or current applied to the electric heater is controlled in accordance with the amplified voltage for measuring the flow rate. As a result, a temperature drift occurs in the DC differential amplifier, thus deteriorating the measuring accuracy of the apparatus. This inconvenience may be improved to some degree by using an element of low drift, but the improvement is not satisfactory on the one hand and the resulting apparatus is higher in cost than the one using a multi-purpose element on the other hand.

Another apparatus is proposed, for example, in U.S. Pat. No. 4,275,590 issued on June 30, 1981 and assigned to the same assignee as the instant application, which is intended to obviate this shortcoming and includes an oscillator circuit for producing a pulse signal, an AC differential amplifier circuit for differentially amplifying a voltage between a pair of diagonal points of the bridge, a rectifier circuit for rectifying the output voltage from the AC differential amplifier circuit, a sample-hold circuit for sampling and holding a sample voltage for only a part of a period of the output voltage of the rectifier circuit synchronous with the pulse signal of the oscillator circuit, a DC differential amplifier circuit for differentially amplifying the output voltage of the sample-hold circuit and a predetermined reference voltage, a power amplifier circuit for amplifying the output voltage of the DC differential amplifier circuit and controlling the voltage applied to the electric heater, and a chopper circuit for interrupting the output voltage of the power amplifier circuit in synchronism with the pulse signal of the oscillator circuit and applying the resulting voltage to the bridge. In this apparatus, the AC amplifier for amplifying the output signal of the bridge has a differential signal input coupled by a capacitor. As a result, in order to secure a large common-mode rejection ratio (CMRR) of the AC amplifier, a feedback resistor, a grounding resistor and an input resistor connected to the differential amplifier used with the AC amplifier are required to have a highly accurate resistance value, thereby leading to a high cost. Further, if the long-term stability can not be assured in the relative value of the leakage current or the capacitance of the coupling capacitor for the differential input, the measuring accuracy of the apparatus will be reduced by the secular variation. For this reason, a high accuracy of the coupling capacitor is required.

SUMMARY OF THE INVENTION

The present invention has been developed in order to obviate the above-mentioned disadvantages, and an object thereof is to provide a low-cost gas flow measuring apparatus which is not affectedly the drift, obviates the problem of a secular variation and is capable of measuring the flow rate accurately for an extended period of time.

DESCRIPTION OF THE PREFERRED EMBODIMENTS

Figure 1:
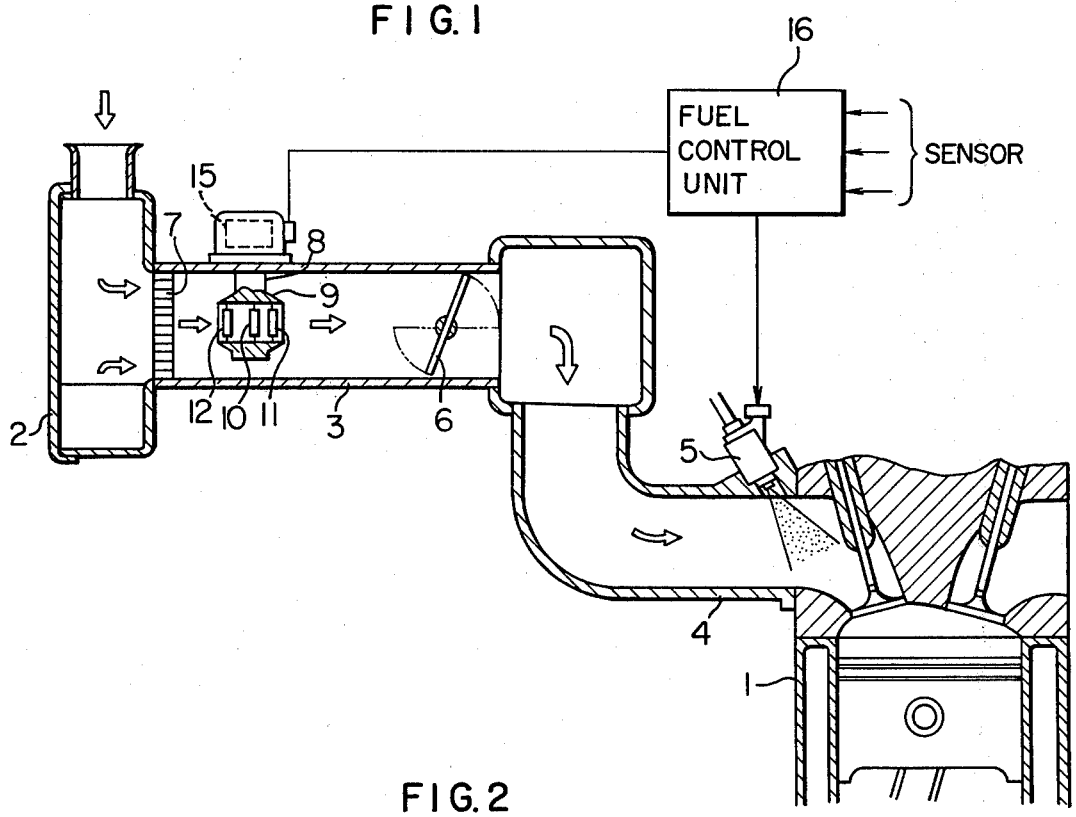
FIG. 1 is a diagram showing a general construction of an embodiment of the present invention.

The present invention will be described below with reference to the embodiment shown in the drawings.

In FIG. 1, an engine 1 is of the spark ignition type for driving the automobile, and takes air through an air cleaner 2, intake pipes 3 and 4 and an air intake valve. Fuel is supplied by being injected from an electromagnetic fuel injection valve 5 mounted in the intake pipe 4.

The intake pipe 3 has therein a throttle valve 6 adapted to be operated as desired by the driver, and a rectifier grid 7 for rectifying the air flow is provided in a coupling between the intake pipe 3 and the air cleaner 2.

Between the rectifier grid 7 and the throttle valve 6 in the intake pipe 3, a small flow rate measuring tube 9 is mounted by a support 8 substantially parallelly with the axis of the intake pipe 3. This measuring tube 9 contains therein an electric heater 10 of platinum resistance wire illustratively shown in the FIG. 1, a first temperature dependent resistor 11 of platinum resistance wire in proximity to and downstream of the electric heater 10, and a second temperature dependent resistor 12 of platinum resistance wire disposed a little distant from and upstream of the electric heater 10.

Figure 2:
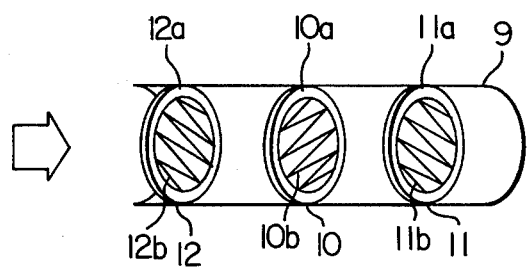
FIGS. 2 and 3 are perspective and front views showing the electric heater and first and second temperature-dependent resistors in FIG. 1 respectively.
Figure 3:
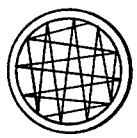

The electric heater 10, the first and second temperature dependent resistors 11 and 12 include, as shown in FIG. 2, annular printed plates 10a, 11a and 12a, and platinum resistance wires 10b, 11b and 12b arranged in grid form on the printed plates respectively. Specifically, the first and second temperature dependent resistors 11 and 12 have the platinum resistance wires of the same temperature-resistance characteristic. It will be seen from FIG. 3 that the electric heater 10 and the first temperature dependent resistor 11 have the resistance wires thereof crossing each other as viewed from the front (or rear) side, so that the first temperature dependent resistor 11 is free of the effect of small heat distribution in the measuring tube 9.

The electric heater 10, the first and second temperature dependent resistors 11 and 12 are connected to a measuring circuit 15, which measures the flow rate of the intake air in response to the output signals of the first and second temperature dependent resistors and produces an electrical signal associated with the flow rate.

A fuel control unit 16 is mainly for controlling the open time of the electromagnetic fuel injection valve 5 in response to the signal from the measuring circuit 15, and is additionally supplied with the signals representing a rotational speed of the engine 1, a temperature of the cooling water, oxygen concentration in the exhaust gas and the like produced from various sensors. The fuel control unit 16 may take a well-known form and will not be described in detail.

Figure 4:
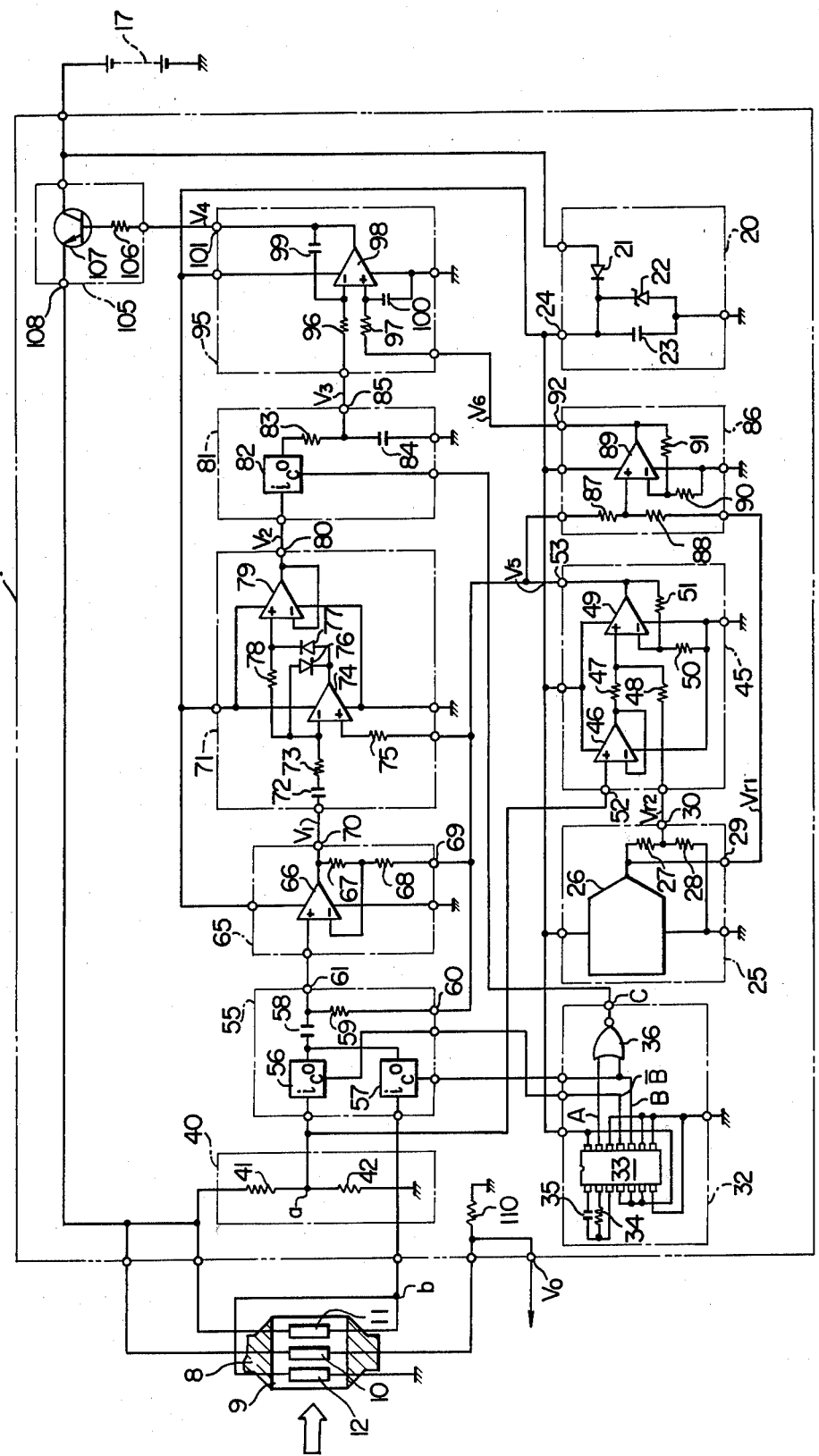
FIG. 4 is an electrical circuit diagram showing the measuring circuit shown in FIG. 1.

The measuring circuit 15 will be described in detail with reference to FIG. 4. The measuring circuit 15 is connected to a DC power supply 17 such as a battery and is supplied with power therefrom. A noise absorber circuit 20 of the measuring circuit 15 is for absorbing the noises superimposed on the power line of the power supply 17, and includes a diode 21, a Zener diode 22 and a capacitor 23. Among the noises generated by the actuation of the ignition system or the starter motor of the engine 1 and superimposed on the power line, those noise voltages 20 V or higher are absorbed by the Zener diode 22 and those noises lower than 20 V are absorbed by the diode 21 and the capacitor 23. Thus, a DC voltage substantially free of noises is produced from a terminal 24.

In the case where the power supply is connected in reverse polarities, the diode 21 blocks the current flow thereby to protect the circuits as mentioned below.

A voltage generator circuit 25 is for generating predetermined reference voltages $Vr_1$ and $Vr_2$, and includes a voltage regulator (e.g., UA78L26 of Fairchild) 26, and resistors 27 and 28. A terminal 29 is the output terminal from which a reference voltage $Vr_1$ of about 2 V is produced. The resistors 27 and 28 are for dividing the output of the voltage regulator 26 and produce a voltage of about 1 V at a terminal 30.

An oscillator circuit 32 is for producing an oscillation output for a sampling and holding purpose and another oscillation output for a chopping, purpose, and includes a multivibrator (e.g., CD4047 of RCA) 33, a resistor 34, a capacitor 35 and an NOR gate 36.

Figure 5:
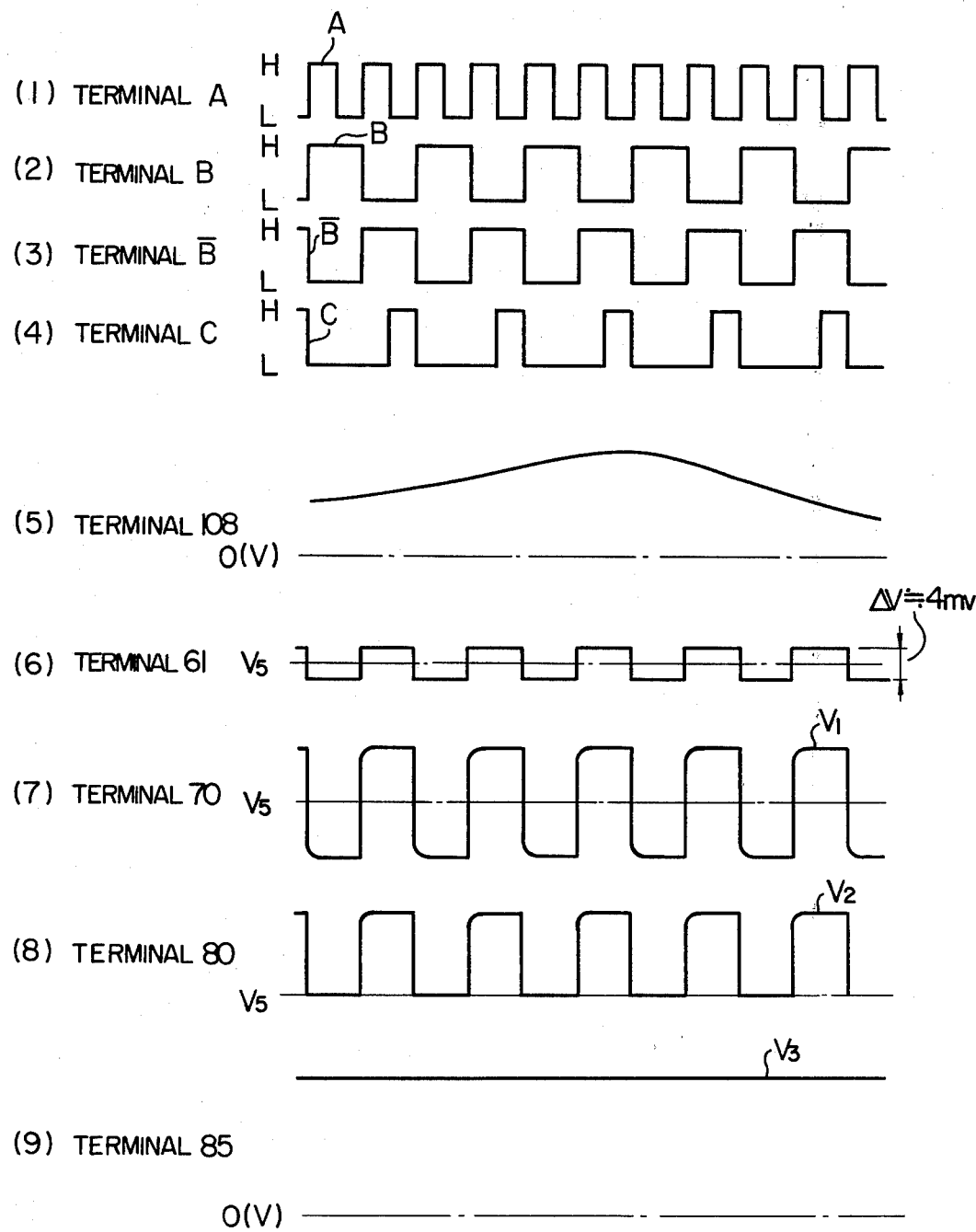
FIG. 5 shows signal waveforms produced at various parts of the circuit of FIG. 4.

The multivibrator 33 is connected in a manner to operate as a non-stable multivibrator, and produces a square wave pulse signal A of about 8 KHz from a terminal A as shown in (1) in FIG. 5. A square wave pulse signal B obtained by frequency dividing the pulse signal A by 2 (½ frequency division) as shown in (2) in FIG. 5 is produced at a terminal $\overline{B}$, and further a pulse signal $\overline{B}$ as shown in (3) in FIG. 5 which is the reversed form of the pulse signal B is produced at a terminal B.

The NOR gate 36 logically processes the pulse signals A and B, and produces a pulse signal C as shown in (4) in FIG. 5 from a terminal C thereof.

A reference resistor circuit 40 is comprised of reference resistors 41 and 42 in series, which, together with the first and second temperature dependent resistors 11 and 12, make up a bridge.

A first adder circuit 45 includes an operational amplifier 46, input resistors 47, 48, an operational amplifier 49, a grounding resistor 50, and a feedback resistor 51, and produces at a terminal 53 the sum of a voltage at a diagonal point a of the bridge and the output voltage $Vr_2$ of the voltage generator circuit 25.

A chopper circuit 55 includes analog switches (e.g., CD4016 of RCA) 56, 57, a capacitor 58 and a resistor 59, and produces at a terminal 61 a potential difference of about 5 mV between the diagonal points a and b of the bridge as converted into a square wave signal. Since a terminal 60 located at an end of the resistor 59 is impressed with the output voltage of the first adder circuit 45 as a hypothetical grounding potential, the output voltage at the terminal 61 takes a peak-to-peak crest value of about 4 mV with respect its center value corresponding to the hypothetical grounding potential. Control terminals of the analog switches 56 and 57 are impressed with the signals $\overline{B}$ and B of the oscilator circuit 32 respectively.

An amplifier circuit 65 includes an operational amplifier 66, a feedback resistor 67 and a grounding resistor 68. The grounding resistor 68 connected to the negative input terminal of the operational amplifier 66 is supplied with the hypothetical grounding potential from a terminal 69. The amplifier circuit 65 amplifies the output signal of the chopper circuit 55 at the gain of about 100 times and produces an output thereof at a terminal 70.

A rectifier circuit 71 is for half-wave rectifying the output signal of the amplifier circuit 65, and includes an input capacitor 72, an input resistor 73, an operational amplifier 74, a grounding resistor 75, diodes 76, 77, a feedback resistor 78 and an operational amplifier 79. The grounding resistor 75 is supplied with the hypothetical grounding potential.

The rectifier circuit 71 includes the diode 77 in the feedback circuit thereof thereby to secure a linearity down to a low voltage. Also, the output of the amplifier circuit 65 is amplified by the operational amplifier 74 at the gain of about 35 times.

The operational amplifier 79 is a kind of impedance converter connected in a voltage follower for producing, after impedance conversion of a potential at the junction point of the diode 77 and the resistor 78, an output at a terminal 80.

A sample-hold circuit 81 is for sampling and holding the output of the terminal 80 of the rectifier circuit 71, and includes an analog switch 82, a resistor 83 and a capacitor 84.

The control terminal of the analog switch 82 is supplied with the output signal of the NOR gate 36 of the oscillator circuit 32. The analog switch 82 is adapted to be turned on at a "high" or "H" level of the output signal of the NOR gate 36, and turned off at a "low" or "L" level thereof. Upon the turning on of the analog switch 82, the capacitor 84 is charged at the time constant of approximately 70 μsec and the output voltage of the rectifier circuit 71 is sampled, while upon the turning off of the analog switch 82, the same voltage is held. This hold voltage is produced at a terminal 85.

A second adder circuit 86 includes input resistors 87, 88, an operational amplifier 89, a grounding resistor 90 and a feedback resistor 91. The second adder circuit 86 adds the output voltage $Vr_1$ of the voltage generator circuit 25 to the output voltage of the first adder circuit 45, and produces at a terminal 92 a voltage corresponding to the sum of the hypothetical grounding potential and a predetermined voltage of about 2 V.

A differential amplifier circuit 95 is for differentially amplifying the output voltage of the sample-hold circuit 81 and the output voltage of the second adder circuit 86. The differential amplifier circuit 95 includes input resistors 96, 97, an operational amplifier 98, and capacitors 99, 100. The capacitors 99 and 100 are provided for preventing the oscillation of the measuring circuit 15.

A power amplifier circuit 105 is comprised of an input resistor 106 and a power transistor 107 for power amplifying the output signal produced at a terminal 101 of the differential amplifier circuit 95 and applying the amplified signal to the bridge (including the first and second temperature dependent resistors 11, 12 and the reference resistors 41, 42) and the electric heater 10.

The resistor 110 is for measuring the current flowing in the electric heater 10 and is connected in series to the electric heater 10.

The operation of the circuit having this configuration will be described. The air of a certain amount determined by the opening of the throttle valve 6 is taken into the engine 1 from the air cleaner 2 through the intake pipe 3. A predetermined proportion of the total air taken into the engine is introduced into the engine 1 through the measuring tube 9.

In the measuring tube 9, the second temperature dependent resistor 12 upstream of the electric heater 10 is affected only by the temperature of the intake air, whereas the first temperature dependent resistor 11 disposed downstream of the electric heater 10 is affected by the amount of heat generated by the electric heater and the temperature of the intake air, that is, the temperature of the air heated by the electric heater 10 applied with a voltage as shown in (5) in FIG. 5.

As a result, there occurs between the temperature dependent resistors 11 and 12 a temperature difference $\Delta T$ associated with the flow rate of the intake air G (g/sec) and the amount of electric power P (W) supplied to the electric heater 10. The values P, G and $\Delta T$ have the following relation:

$$K_1 \cdot \Delta T = P/G \qquad (1)$$

where $K_1$ is a constant.

Since the resistance values of the temperature dependent resistors 11 and 12 vary with the temperature of the air respectively, the potential difference $\Delta V$ determined by the voltage V applied to the bridge and by the temperature difference $\Delta T$ is generated between the points a and b of the bridge as shown by equation (2) below.

$$\Delta V = K_2 \cdot \Delta T \cdot V \qquad (2)$$

where $K_2$ is a constant.

Thus the equation below is obtained from the equations (1) and (2).

$$K_3 \cdot \Delta V/V = P/G \qquad (3)$$

where $K_3$ is a constant.

Therefore, if the potential difference $\Delta V$ is maintained constant by regulating the power P of the electric heater 10 and the voltage V applied to the bridge, the relation as mentioned below is obtained between the flow rate G of the intake air, the supplied power P and the voltage V applied to the bridge.

$$G = K_4 \cdot P \cdot V \qquad (4)$$

where $K_4$ is a constant.

Assume that the resistance value of the output resistor 110 is smaller than that of the electric heater 10, and current I flows in the electric heater 10. Then equations (5) and (6) below are established.

$$P \doteq K_5 \cdot I^2 \qquad (5)$$

($K_5$: Constant)

$$V \doteq K_6 \cdot I \qquad (6)$$

($K_6$: Constant)

from which equation (4) is given as $$G \doteq K \cdot I^3 \qquad (7)$$

(K: Constant)

As seen from this equation, the flow rate of the intake air G is a function of the cube of the current I (or voltage V). Equation (7) is an approximation to such an extent as not to affect the measurement and therefore poses substantially no practical problem.

The measuring circuit 15 maintains the potential difference $\Delta V$ at a predetermined level by controlling the amount of heat generated by the electric heater 10. Specifically, the analog switches 56 and 57 are connected in such a manner as to be turned on and off alternately, and therefore the capacitor 58 is charged and discharged by the potential difference between the voltage $V_5$ applied to the terminal 60 and the potentials at the diagonal points a and b of the bridge at the time constant determined by the capacitor 58 and the resistor 59. Thus a signal of the square wave as shown in (6) in FIG. 5 with the crest value (peak-to-peak value) equal to the potential difference $\Delta V$ between the diagonal points a and b of the bridge is produced at the terminal 61. In other words, suppose that the potentials at the diagonal points a and b of the bridge be Va and Vb, and the hypothetical potential applied to the terminal 60 be $V_5$. Then the voltage Vc across the capacitor 58 is given as $$VC_1 = V_5 - Va \qquad (8)$$

when the analog switch 56 is "on" and the analog switch 57 is "off"; and $$VC_2 = V_5 - Vb \qquad (9)$$

when the analog switch 56 is "off" and the analog switch 57 is "on". From equations (8) and (9), the crest value of the output voltage at the terminal 61 is given as $$VC_1 - VC_2 = Vb - Va = \Delta V \qquad (10)$$

The potential difference between the diagonal points a and b of the bridge is thus produced at the terminal 61.

The terminal 60 is supplied with the sum of the reference voltage $Vr_2$ and the potential at the diagonal point a of the bridge as produced from the first adder circuit 45 in order to eliminate any error in the potential difference $\Delta V$ of the output voltage of the chopper circuit 55 at the time of an abrupt change of the voltage applied to the bridge under a transient condition. An output voltage signal having a waveform as shown in (7) in FIG. 5 is produced at the terminal 70 as a result of the amplification of the output of the chopper circuit 55 by the amplifier circuit 65. The amplifier circuit 65 has an amplification factor of about 100 times and therefore an offset error occurs. Since a capacitor 72 is inserted in the coupling with the rectifier circuit 71 in the next stage, however, the offset may be ignored. The rectifier circuit 71 thus effects half wave rectification and amplification of approximately 10 times. The half wave rectification is effected in order to set the hypothetical grounding potential $V_5$ (about 1.5 to 4.5 V) at a point nearer to the ground side from the neutral point of the source voltage thereby to actuate the operational amplifier with the battery (12 V) of the automobile, and to secure as wide a dynamic range as possible thereby to prevent the distortion of the waveform by saturation of the output of the operational amplifier on the ground side. The waveform output at the terminal 80 of the rectifier circuit 71 is shown in (8) in FIG. 5. This signal is further applied to the sample-hold circuit 81, so that the analog switch 82 is turned on and off by the pulse shown in (4) in FIG. 5 and the crest value of the waveform of (8) in FIG. 5 is sampled and held at the capacitor 84, thus producing a voltage signal shown in (9) in FIG. 5. Under this condition, the voltage $V_3$ produced at the terminal 85 of the sample-hold circuit 81 is given as $$V_3 = K_7 \cdot \Delta V + V_5 \tag{11}$$

where $K_7$ is a constant of about 500.

The second adder circuit 86 is a voltage follower type adding circuit including an operational amplifier 89 and a resistor for adding the hypothetical grounding potential $V_5$ to the reference voltage $V_{r1}$ of about 2 V produced at the terminal 29 of the voltage generator circuit 25, the resulting sum being produced at the terminal 92. This voltage $V_6$ is expressed as $$V_6 = V_5 + V_{r1} \tag{12}$$

The voltage $V_3$ is applied to the inverting input of the differential amplifier 95 and the voltage $V_6$ to the non-inverting input thereof, and therefore the output voltage $V_4$ at the terminal 101 is given as $$V_4 = (V_6 - V_3) \times K_8 \tag{13}$$

where $K_8$ is an open loop gain of the operational amplifier 98.

Under the steady condition (when the voltage applied to the bridge is constant at a certain level), the value $K_8$ in equation (13) is generally about $10^5$ for ordinary operational amplifiers. Therefore, if $K_8 \div \infty$, equation (13) is rewritten as $V_6 = V_3$. Thus from equations (11) and (12), $$\Delta V = (1/K_7) \cdot V_{r1} \tag{14}$$

It is seen that the value $\Delta V$ is constant. The capacitors 99 and 100 of the differential amplifier 95 serve to prevent the oscillation thereby to stabilize the controlling operation in high-frequency ranges.

With an increase in the amount of intake air, the temperature increase of the air heated by the electric heater 10 is reduced, and the temperature difference $\Delta T$ between the first and second temperature dependent resistors 11 and 12 is also reduced, so that the potential difference between the diagonal points a and b of the bridge decreases thereby to reduce the crest value of the output voltage of the chopper circuit 55. The crest value of the output voltage $V_1$ of the amplifier circuit 65 is reduced, and the output voltage $V_3$ of the sample-hold circuit 81 is reduced. As a result, the voltage signal $V_6$ is reduced below the voltage $V_3$, so that the output signal $V_4$ of the differential amplifier circuit 95 increases. This signal $V_4$ is amplified by the power amplifier 105 and applied as a large voltage to the bridge and the electric heater 10, thus increasing the amount of heat generated at the electric heater 10.

When the temperature difference $\Delta T$ between the first and second temperature dependent resistors 11 and 12 is increased, followed by an increase in the potential difference $\Delta V$ between the diagonal points a and b of the bridge thereby to attain a condition where the voltage $V_3$ associated with the value $\Delta V$ is equal to the voltage $V_6$, the whole system is balanced and the bridge is unbalanced thereby to achieve a stable condition.

With a decrease in the flow rate of the intake air, on the other hand, the temperature increase of the air heated by the electric heater 10 is accelerated, and the temperature difference $\Delta T$ between the first and second temperature dependent resistors 11 and 12 increases, thus increasing the potential difference $\Delta V$.

As a result, the crest value of the output voltage $V_1$ of the amplifier circuit 65 increases, and so does the crest value $V_2$ of the output voltage of the rectifier circuit 71. The output voltage $V_3$ of the sample-hold circuit 81 increases, while the output voltage $V_4$ of the DC differential amplifier circuit 95 for generating a voltage corresponding to $V_6 - V_3$ decreases, so that the transistor 107 of the power amplifier circuit 105 reduces the current supplied to the electric heater 10, thus reducing the amount of heat generation of the electric heater 10.

The result is that the temperature difference $\Delta T$ is reduced thereby to reduce the potential difference $\Delta V$, so that the voltage $V_3$ becomes equal to the voltage $V_6$, thus attaining the stable state of the system.

Since the small differential voltage signal of about 4 mV between the diagonal points a and b of the bridge is processed by a single-input amplifier and the coupling capacitor is of a single coupling type, a resistor or capacitor of high accuracy is not required, thus enables an accurate control at low cost.

The potential difference $\Delta V$ between the points a and b of the bridge which is established as shown by equation (14) is always held accurately at a predetermined value without regard to the flow rate of the intake air. Therefore, equation (7) is established, and thus the flow rate G of the intake air is expressed as a function of the cube of the current I flowing in the electric heater 10.

This current I flows also in the output resistor 110, and therefore the current I is proportional to the terminal voltage $V_0$ of the output resistor 110, so that the cube of the voltage $V_0$ is proportional to the flow rate G of the intake air. The voltage $V_0$ is thus produced as a voltage associated with the flow rate of the intake air.

The voltage $V_0$ is applied to the fuel control unit 16 as a signal representing the flow rate G of the intake air, and the fuel control unit 16 produces an injection pulse signal for opening the fuel injection valve 5 in accordance with this signal and the output signals of the rotational speed sensor, etc.

In the aforementioned embodiment, the output of the first adder circuit is the sum of the output voltage of the voltage generator circuit and the voltage at a diagonal point on the fixed resistor side of the bridge. In place of this, the output of the voltage generator circuit may be added to the potential at the other diagonal point of the bridge with equal effect.

Also, in the above-described embodiment using a bipolar operational amplifier, the output voltage of the voltage generator circuit applied to the first adder circuit may be reduced to zero or the first adder circuit may be done without, if the operational amplifier is of MOS instead of bipolar type (such as CA3130 of RCA).

Further, although the aforementioned embodiment concerns a fuel injection type engine, the present invention may be used with equal effect with a carburetor type engine in which the amount of the recirculated exhaust gas and the advance angle of ignition timing are controlled by the amount of the air taken in.

Furthermore, the present invention may be applied not merely to the measurement of the flow rate of intake air of the engine but also the measurement of the flow rate of a gas other than air by weight in other fields of industrial measurements.

It will be understood from the foregoing description that according to the gas flow measuring apparatus according to the present invention, the amplifier circuit for detecting a small signal of the output potential difference of the bridge does not require any accurate capacitor or resistor. Therefore, the temperature drift may be prevented and the long-term stability is secured by use of low-cost parts on the one hand and the flow rate of the gas involved is detected with high accuracy on the other hand.

We claim:

1. A gas flow measuring apparatus comprising:
   an electric heater disposed in a tube in which an object gas flows;
   a first temperature dependent resistor disposed downstream of said electric heater in said tube;
   a second temperature dependent resistor disposed at a point free from the heat effect of said electric heater in said tube, and
   a measuring circuit for measuring the flow rate of said object gas by use of output signals of said electric heater and said first and second temperature dependent resistors,
   said measuring circuit includes a reference resistor circuit making up a bridge together with said first and second temperature dependent resistors,
   an oscillator circuit for producing a pulse signal,
   a voltage generator circuit for generating a predetermined reference voltage,
   a chopper circuit driven by said pulse signal of said oscillator circuit for amplitude-modulating and converting a potential difference between one pair of diagonal points of said bridge into an AC signal,
   a sample-hold circuit for sampling an amplified output voltage of said chopper circuit only for a partial period synchronous with the pulse signal of said oscillator circuit and holding said sampling votage,
   a DC differential amplifier circuit for amplifying a difference voltage between a voltage based on the reference voltage produced from said voltage generator circuit and the output voltage of said sample hold circuit, and
   a power amplifier circuit for power amplifying the output voltage of said DC differential amplifier circuit and applying the resulting voltage to said electric heater and said bridge, said potential difference between the pair of diagonal points of said bridge being controlled at a constant level thereby to measure the flow rate of the object gas from the value of the current flowing in said electric heater.

2. A gas flow measuring apparatus according to claim 1 wherein
   said chopper circuit includes first and second analog switches respectively connected to said one pair of points of said bridge and each connected to said oscillator circuit, said chopper circuit converting said potential difference between said one pair of points of said bridge circuit into a square wave signal having a peak-to-peak value substantially corresponding to said potential difference.

3. A gas flow measuring apparatus according to claim 1, wherein
   an amplifier circuit including an operational amplifier having a non-inverting input connected to receive said AC signal output, said amplifier circuit constituting a single input amplifier.

4. A gas flow measuring apparatus according to claim 1 wherein
   said voltage generating circuit includes a voltage regulator and an output resistor circuit.

5. A gas flow measuring apparatus comprising:
   an electric heater disposed in a gas tube;
   first and second temperature dependent resistors respectively disposed downstream and upstream of said electric heater in said gas tube, said second temperature dependent resistor being spaced from said electric heater so that heat generated by said electric heater does not influence said second resistor;
   a reference resistor circuit including first and second reference resistors connected in series;
   said first and second temperature dependent resistors and said first and second reference being connected to form a bridge circuit, one pair of diagonal points include a junction between said first and second reference resistors and a junction between said first and second temperature dependent resistors, said one pair of diagonal points producing therebetween a potential difference ($\Delta V$) as functions of flow rate (G) of gas in the gas passage tube, power (P) supplied to said electric heater and voltage (V) applied to the other pair of diagonal points of said bridge circuit;
   a voltage generating circuit for generating first and second reference voltages;
   an oscillator circuit for producing a pulse signal;
   a first adding circuit connected to one of said one pair of diagonal points of said bridge circuit and connected to said voltage generating circuit to receive said second reference voltage ($V_{r2}$) for producing a first sum voltage ($V_5$) of a potential ($V_a$) of said one point of said one pair of diagonal points of said bridge circuit and said second reference voltage ($V_{r2}$);
   a chopper circuit connected to receive said potential difference ($\Delta V$) from said bridge circuit, connected to said oscillator circuit, and connected to said first adder circuit to receive said first sum voltage ($V_5$) as a hypothetical ground potential at output terminal through a resistor, said chopper circuit converting under control of said pulse signal from said oscillator circuit said potential difference ($\Delta V$) into a square wave signal having a center reference level corresponding to said first sum voltage ($V_5$);
   an amplifier circuit connected to said chopper circuit and said first adder circuit for producing an amplified rectangular wave signal ($V_1$) having a center reference corresponding to said first sum voltage ($V_5$);
   a rectifier circuit connected to said amplifier circuit and said first adder circuit for half-wave rectifying said amplified rectangular wave signal;
   a sample-hold circuit connected to said rectifier circuit and said oscillator circuit for producing a voltage signal ($V_3$) having a magnitude varied depending on said potential difference ($\Delta V$);
   a second adder circuit connected to said voltage generating circuit and said first adder circuit for producing a second sum voltage ($V_6$) of said first sum voltage ($V_5$) and said first reference voltage ($V_{r1}$);

a differential amplifier connected to said sample-hold circuit and said second adder circuit for producing an output voltage ($V_4$) proportional to a difference between said voltage signal ($V_3$) from said sample-hold circuit and said second sum voltage ($V_6$) from said second adder circuit; and a power amplifier circuit connected to said differential amplifier circuit for applying to said bridge circuit an amplified voltage of said output voltage ($V_4$) from said differential amplifier, said amplified voltage being increased with increased flow rate of the intake air due to a decrease in said potential difference ($\Delta V$) between said one pair of diagonal points of said bridge circuit thereby to increase the heat generated by said electric heater resulting in an increase of said potential difference ($\Delta V$) to maintain said potential difference ($\Delta V$) at a predetermined constant value, whereas said amplified voltage being reduced with decreased flow rate due to an increase in said potential difference ($\Delta V$) thereby to reduce the heat generated by said electric heater resulting in a decrease of said potential difference ($\Delta V$) to maintain said potential difference constant to achieve a stabilized state of control of said bridge circuit, a value of current flowing through said electric heater being used to determine the gas flow rate.

* * * * *